United States Patent
Lee

(10) Patent No.: US 11,150,822 B2
(45) Date of Patent: Oct. 19, 2021

(54) MEMORY SYSTEM FOR DETERMINING USAGE OF A BUFFER BASED ON I/O THROUGHPUT AND OPERATION METHOD THEREOF

(71) Applicant: SK hynix Inc., Icheon (KR)

(72) Inventor: Seok-Jun Lee, Seoul (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/776,117

(22) Filed: Jan. 29, 2020

(65) Prior Publication Data

US 2021/0011642 A1     Jan. 14, 2021

(30) Foreign Application Priority Data

Jul. 8, 2019 (KR) .................. 10-2019-0081957

(51) Int. Cl.
*G06F 3/06* (2006.01)
*G06F 12/02* (2006.01)

(52) U.S. Cl.
CPC ............ *G06F 3/0634* (2013.01); *G06F 3/065* (2013.01); *G06F 3/0613* (2013.01); *G06F 3/0656* (2013.01); *G06F 3/0659* (2013.01); *G06F 3/0679* (2013.01); *G06F 12/0253* (2013.01); *G06F 2212/1044* (2013.01)

(58) Field of Classification Search
CPC .... G06F 3/0634; G06F 3/0679; G06F 3/0613; G06F 12/0253; G06F 3/065; G06F 3/0659; G06F 3/0656; G06F 2212/1044
See application file for complete search history.

(56) References Cited

U.S. PATENT DOCUMENTS

| | | | |
|---|---|---|---|
| 5,778,194 A * | 7/1998 | McCombs | G06F 11/3409 710/113 |
| 8,713,268 B2 | 4/2014 | Dillow et al. | |
| 9,645,917 B2 | 5/2017 | Small et al. | |
| 2010/0169604 A1* | 7/2010 | Trika | G06F 12/0246 711/170 |
| 2013/0010131 A1 | 1/2013 | Silverbrook | |
| 2016/0092129 A1* | 3/2016 | Agarwal | G11C 11/5621 714/764 |
| 2016/0225459 A1 | 8/2016 | Boysan et al. | |
| 2020/0073795 A1* | 3/2020 | Asano | G06F 3/0679 |

FOREIGN PATENT DOCUMENTS

KR     101026634 B1     4/2011

* cited by examiner

*Primary Examiner* — Michelle T Bechtold

(57) ABSTRACT

A memory system includes a memory device including first memory blocks each including a memory cell storing a 1-bit data, and second memory blocks each including a memory cell storing a multi-bit data. The memory system further includes a controller configured to estimate data input/output speed of an operation requested by an external device and to determine, based on the estimated data input/output speed, a buffering ratio of pieces of buffered data, temporarily stored in the first memory blocks, to pieces of inputted data. The controller uses the buffer ratio to determine whether to program pieces of inputted data into the second memory blocks directly or to buffer the inputted data in the first memory blocks before programming it into the second memory blocks.

16 Claims, 10 Drawing Sheets

FIG. 9

SLC PROGRAM TIME < SLC GC TIME < TLC PROGRAM TIME

| I/O THROUGHPUT RANGE | OPERATION |
|---|---|
| TH#1> | SLC BUFFERING |
| TH#1~TH#2 | SLC BUFFERING /w GC |
| <TH#2 | DISABLE SLC BUFFERING |

FIG. 10

SLC PROGRAM TIME < TLC PROGRAM TIME < SLC GC TIME

| I/O THROUGHPUT RANGE | OPERATION |
|---|---|
| TH#1> | SLC BUFFERING |
| TH#1~TH#2 | DISABLE SLC BUFFERING |
| <TH#2 | SLC BUFFERING /w GC |

# MEMORY SYSTEM FOR DETERMINING USAGE OF A BUFFER BASED ON I/O THROUGHPUT AND OPERATION METHOD THEREOF

CROSS-REFERENCE TO RELATED APPLICATION

This patent application claims the benefit of Korean Patent Application No. 10-2019-0081957, filed on Jul. 8, 2019, the entire disclosure of which is incorporated herein by reference.

TECHNICAL FIELD

An embodiment of the invention relates to a memory system, and more particularly, to a method and an apparatus for controlling usage of a component included in the memory system based on input/output (I/O) throughput.

BACKGROUND

Recently, a computer environment paradigm has shifted to ubiquitous computing, which enables a computer system to be accessed anytime and everywhere. The use of portable electronic devices such as mobile phones, digital cameras, notebook computers and the like increases. Such portable electronic devices typically use or include a memory system that uses or embeds at least one memory device, i.e., a data storage device. The data storage device can be used as a main storage device or an auxiliary storage device of a portable electronic device.

In a computing device a data storage device using a nonvolatile semiconductor memory device is advantageous in that it has excellent stability and durability because, unlike a hard disk, it has no mechanical driving part (e.g., a mechanical arm), and has high data access speed and low power consumption. Examples of such a data storage device include a USB (Universal Serial Bus) memory device, a memory card having various interfaces, and a solid state drive (SSD).

BRIEF DESCRIPTION OF THE DRAWINGS

The description herein makes reference to the accompanying drawings wherein like reference numerals refer to like parts throughout the several views, and wherein:

FIG. 9 illustrates a first process for determining SLC buffering according to an embodiment of the disclosure;

FIG. 10 illustrates a second process for determining SLC buffering according to an embodiment of the disclosure.

DETAILED DESCRIPTION

Figure 1:
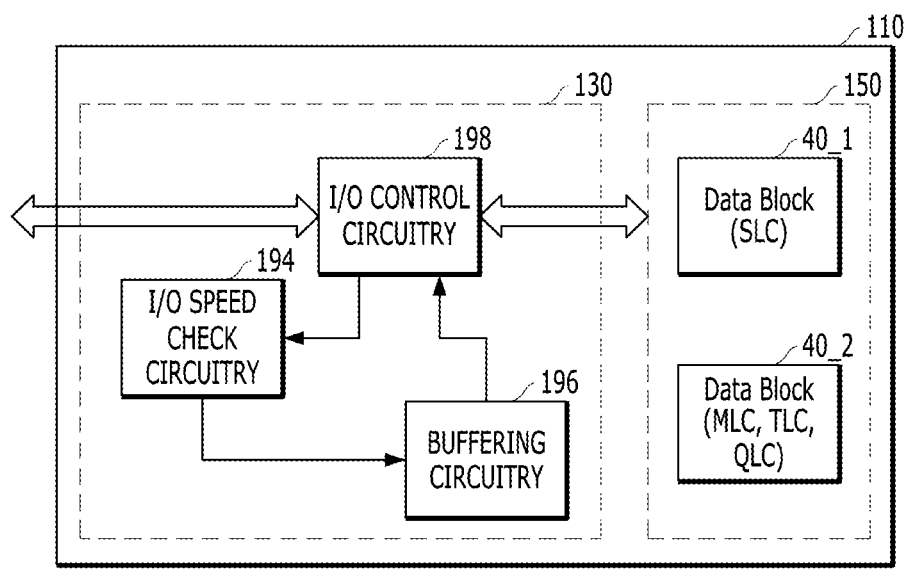
FIG. 1 shows a memory system according to an embodiment of the disclosure.

Various examples of the disclosure are described below in more detail with reference to the accompanying drawings. Aspects and features of the present invention, however, may be embodied in different ways to form other embodiments, including variations of any of the disclosed embodiments. Thus, the invention is not to be construed as being limited to the embodiments set forth herein. Rather, the described embodiments are provided so that this disclosure is thorough and complete and fully conveys the disclosure to those skilled in the art to which this invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the invention belongs in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

An embodiment of the disclosure can provide a memory system, a data processing system, and an operation process or a method, which can quickly and reliably process data into a memory device by reducing operational complexity and performance degradation of the memory system, thereby enhancing usage efficiency of the memory device.

An embodiment of the disclosure can provide an apparatus or a method for determining whether a buffer is used based at least on data input/output (I/O) speed (I/O throughput) which corresponds to an operation requested by a host or corresponding to a current operation of the memory system, in a situation that a nonvolatile memory block including single level cells (SLC) in a memory system is utilized as the buffer for temporarily storing data.

An embodiment of the disclosure can provide an apparatus or a method for comparing a first data input/output (I/O) rate, a second data I/O rate and a third data I/O rate with thresholds corresponding to each of the first to third data I/O rates, respectively, to determine whether to store data in a memory block including single level cells. By the way of example but not limitation, the first data I/O rate may be calculated based on an amount of data completely programmed in a memory system by a program operation requested from an external device or a computing device interworking with the memory system. The second data I/O rate may be estimated in a program operation using a nonvolatile memory block including single level cells (SLC) as a buffer that temporarily stores a piece of data. The third data I/O rate may be estimated in a program operation using a nonvolatile memory block including single level cells (SLC) as a buffer that temporarily stores a piece of data after garbage collection (GC) is performed to the nonvolatile memory block.

In addition, an embodiment of the disclosure can provide an apparatus or a method for adjusting a time point of erasing a nonvolatile memory block including single level cells (SLC), which is used as a buffer during a program operation, or performing garbage collection (GC) to the nonvolatile memory block, in order to avoid decreasing data input/output speed of a memory system in a situation that the nonvolatile memory block including single level cells (SLC) in the memory system is utilized as the buffer for temporarily storing data during the program operation.

In an embodiment, a memory system can include a memory device including one or more first memory blocks, each including a memory cell storing a 1-bit data, and one or more second memory blocks, each including a memory cell storing a multi-bit data; and a controller configured to estimate a data input/output speed of an operation requested by an external device and to determine, based on the estimated data input/output speed, a buffering ratio of pieces of buffered data, temporarily stored in at least one first memory block, with respect to pieces of inputted data in order to program the pieces of inputted data in at least one second memory block according to a request of the external device.

By the way of example but not limitation, the controller can be configured to divide the pieces of inputted data into two groups based on the buffering ratio; perform a first program operation of a piece of data in a first of the two groups to the one or more first memory blocks; and perform a second program operation of another piece of data in a second of the two groups to the one or more second memory blocks.

The controller can be configured to use the one or more first memory blocks as a buffer for temporarily storing the pieces of buffered data when the data input/output speed is faster than a first threshold, program the pieces of inputted data to the one or more second memory blocks without temporarily storing the pieces of inputted data in the one or more first memory blocks when the data input/output speed is slower than a second threshold, and perform garbage collection on at least one of the first memory blocks and use another of the first memory blocks as the buffer when the data input/output speed is slower than or equal to the first threshold and faster than or equal to the second threshold. The first threshold is larger than the second threshold.

The garbage collection can be performed on a closed memory block among the first memory blocks, and an open memory block among the first memory blocks is utilized as the buffer.

The controller can be configured to use the one or more first memory blocks as a buffer for temporarily storing the pieces of buffered data when the data input/output speed is faster than a first threshold, perform garbage collection on at least one of the first memory blocks and use another of the first memory blocks as the buffer when the data input/output speed is slower than a second threshold, and program the pieces of inputted data to the one or more second memory blocks without temporarily storing the pieces of inputted data in the one or more first memory blocks when the data input/output speed is slower than or equal to the first threshold and faster than or equal to the second threshold.

The controller can be configured to receive a real time clock (RTC) inputted from the external device and determine the data input/output speed based on an amount of data inputted or outputted between two times established based on the real time clock.

The controller can be configured to check whether a usage of the first memory blocks is equal to or greater than a fourth threshold and copy the pieces of buffered data temporarily stored in the one or more first memory blocks into the one or more second memory blocks in response to the usage of the first memory blocks being equal to or greater than the fourth threshold.

The controller can be configured to copy the pieces of buffered data temporarily stored in the one or more first memory blocks into the one or more second memory blocks when the memory device is in an idle state.

The one or more second memory blocks can include at least one double-level cell, at least one triple-level cell, or at least one quad-level cell.

Memory cells of the one or more first memory blocks have the same structure as memory cells of the one or more second memory blocks, and the controller can be configured to store respective 1-bit data in the memory cells of the one or more first memory blocks and respective multi-bit data in the memory cells of the one or more second memory blocks.

In another embodiment, a method for operating a memory system, including a memory device including one or more first memory blocks, each including a memory cell storing a 1-bit data, and one or more second memory blocks, each including a memory cell storing a multi-bit data, can include receiving pieces of inputted data transmitted from an external device, estimating a data input/output speed of an operation requested by the external device, determining, based on the estimated data input/output speed, a buffering ratio of pieces of buffered data, temporarily stored in the one or more first memory blocks, to pieces of inputted data, and determining, based on the buffering ratio, whether to program the pieces of inputted data either into the one or more first memory blocks or into the one or more second memory blocks.

The method can further include dividing the pieces of inputted data into two groups based on the buffering ratio.

The method can further include using the one or more first memory blocks as a buffer for temporarily storing the pieces of buffered data when the data input/output speed is faster than a first threshold, programming the pieces of inputted data to the one or more second memory blocks without temporarily storing the pieces of inputted data in the one or more first memory blocks when the data input/output speed is slower than a second threshold, and performing garbage collection on at least one of the one or more first memory blocks and using another of the first memory blocks as the buffer when the data input/output speed is slower than, or equal to, the first threshold and faster than, or equal to, the second threshold.

The garbage collection can be performed on a closed memory block among the first memory blocks, and an open memory block among the first memory blocks is utilized as the buffer.

The method can further include using the one or more first memory blocks as a buffer for temporarily storing the pieces of buffered data when the data input/output speed is faster than a first threshold, performing garbage collection someone at least one of the one or more first memory blocks and using another of the first memory blocks as the buffer when the data input/output speed is slower than a second threshold, and programming the pieces of inputted data to the one or more second memory blocks without temporarily storing the pieces of inputted data in the one or more first memory blocks when the data input/output speed is slower than or equal to the first threshold and faster than or equal to the second threshold.

The step for estimating the data input/output speed can include receiving a real time clock (RTC) inputted from the external device, and determining the data input/output speed based on an amount of data inputted or outputted between two times established based on the real time clock.

The method can further include checking whether a usage of the first memory blocks is equal to or greater than a fourth threshold and copying the pieces of buffered data temporarily stored in at least one of the one or more first memory blocks into the one or more second memory blocks in response to the usage of the first memory blocks being equal to or greater than the fourth threshold.

The method can further include copying the pieces of buffered data temporarily stored in the one or more first memory blocks into the one or more second memory blocks when the memory device is in an idle state.

By the way of example but not limitation, memory cells of the one or more first memory blocks and memory cells of the one or more second memory blocks have the same structure.

Embodiments of the disclosure are described in detail below with reference to the accompanying drawings, wherein like numbers reference like elements.

FIG. 1 illustrates a memory system 110 according to an embodiment of the disclosure. In a computing device, a mobile device or the like including the memory system 110, a host 102 (shown in FIG. 2) can be operatively coupled with the memory system 110 for data input/output (I/O) operation.

Referring to FIG. 1, the memory system 110 can include a controller 130 and a memory device 150. The controller 130 may output data requested by the host 102 and delivered from the memory device 150, or store data transferred from the host 102 to the memory device 150. The controller 130 and the memory device 150 may be coupled through a plurality of data paths. For example, the memory device 150 may include a plurality of memory dies. Each of the plurality of memory dies may include a plurality of memory blocks. Each memory block may include a plurality of non-volatile memory cells, each capable of storing data. Here, an internal structure and/or configuration of the memory device 150 can be different based on specification or required performance of the memory device 150. The specification or required performance may be varied according to purposes for which the memory system 110 is used, requirements of the host 102, or both.

The memory device 150 may include a nonvolatile memory cell. A nonvolatile memory cell can store data even when power is turned off or not supplied. Further, in embodiments such as flash memory, after programming a nonvolatile memory cell with a piece of data, that nonvolatile memory cell may not easily be overwritten with another piece of data without deleting (i.e. erasing) the previously programmed data. An operation for programming a piece of data may be performed on a page basis. The page may be a group of memory cells in the memory device 150 that are read together by a read operation, written together by a program operation, or both. An operation for erasing a piece of data may be performed in a memory block basis. The memory block may be a group of memory cells in the memory device 150 that are erased together by an erase operation. In embodiments, a memory block may include a plurality of pages.

The memory device 150 may include a first memory block 40_1 including a single-level cell (SLC) and a second memory block 40_2 including a multi-level cell (MLC). Here, the single-level cell (SLC) is a kind of memory cells that individually stores one bit of data. The multi-level cell (MLC) is a kind of memory cells that individually stores multiple bits of data. For example, the multi-level cell (MLC) may include at least one of a double-level cell (DLC) storing two-bit data, a triple-level cell (TLC) storing 3-bit data, or a quad-level cell (QLC) for storing 4-bit data.

The single-level cell (SLC) and the multi-level cell (MLC) may operate at different operation speeds, as well as may have different amounts (e.g., the number of bits) of data that can be stored in an individual cell. For example, a time required for reading and writing a piece of data from the single level cell SLC may be shorter than the comparable times of the multi-level cell MLC. In addition, the single-level cell (SLC) may have a longer lifespan (e.g., more durability) than the multi-level cell (MLC). Although the multi-level cell (MLC) may operate slowly and have a short lifespan, the multi-level cell (MLC) may be used in highly integrated computing devices, electronic devices, data processing systems, and the like, because an amount of data that can be stored in the multi-level cell (MLC) is larger per unit area (e.g., in the same area) than that of single-level cell (SLC).

According to an embodiment, even when the memory device 150 includes a single type of memory cells (i.e., all memory cells have the same structure) that can store multiple bits of data per memory cell, the controller 130 may store 1-bit data in some memory cells included in the memory device 150 but multi-bit data in other memory cells included in the memory device 150. For example, the memory cells included in the memory device 150 may have the same structure which can store multi-bit data. However, the controller 130 may program 1-bit data in some memory cells which can store multi-bit data and multi-bit data in other memory cells.

Read and program operations in the multi-level cell (MLC) may be slower than those in the single-level cell (SLC) even when the structure of the two cells is the same. Thus, when a read or program operation is performed to the multi-level cell (MLC) in the memory system, data input/output (I/O) speed (e.g., I/O throughput) of the memory system 110 may decreases. To solve this problem, the first memory block 40_1 including the single-level cell SLC in the memory device 150 may be used as a buffer for temporarily storing a piece of data, and the second memory block 40_2 including the multi-level cell MLC may be considered a destination into which the piece of data is to eventually be programmed. For example, when an external device or a computing device (e.g., a host 102 shown in FIGS. 2 and 3) sends a program request with a piece of data to the memory system 110, the memory system 110 may program the piece of data in the memory device 150. When the piece of data received by the memory system 110 is programmed in the second memory block 40_2 including the multi-level cell (MLC), a time required for the program operation may be longer than that in the first memory block 40_1, so that it may be difficult to provide a data input/output (I/O) speed (e.g., I/O throughput) required by the host 102. Thus, the memory system 110 may try to temporarily store the piece of data inputted from the host 102 in the first memory block 40_1 including the single level cell SLC, so as to reduce a time required for completing the program operation, so that the data input/output (I/O) speed (e.g., I/O throughput) of the memory system 110 can be improved. When the memory system 110 is in an idle state because there is no operation required from the host 102, the controller 130 may transfer the piece of data temporarily stored in the first memory block 40_1 into the second memory block 40_2. These operations can be described as SLC buffering.

The SLC buffering operation may utilize the first memory block 40_1, including the single-level cell SLC which has a relatively high operational speed of reading and writing a piece of data stored therein, as a buffer for temporarily storing a piece of inputted data (e.g., a piece of data inputted along with a program request). However, the single level cell (SLC) included in the first memory block 40_1 is a kind of non-volatile memory cell, and may not support overwriting like a memory cell included in a volatile memory. Accordingly, in order to utilize the first memory block 40_1 as the buffer for temporarily storing a piece of data, the controller 130 should move the piece of data temporarily stored in the first memory block 40_1 into the second memory block 40_2 and perform garbage collection (GC) to the first memory block 40_1 having no valid data to secure free memory blocks for use as the buffer.

In order to temporarily store a piece of data transferred from an external device in the first memory block 40_1 including the single level cell (SLC), a sufficient space for temporarily storing inputted data should be secured in the first memory block 40_1. When there is insufficient space is in the first memory block 40_1, garbage collection (GC) on the first memory block 40_1 could be performed to secure sufficient space for temporarily storing the inputted data. When the garbage collection (GC) on the first memory block 40_1 is be performed in order to program the inputted data transferred from the external device, the garbage collection may be considered overheads. If the memory system 110 already has the sufficient space in the first memory block 40_1, the overheads due to garbage collection GC of the first memory block 40_1 may be avoided or reduced. In an embodiment, the first memory block 40_1 may include a plurality of memory blocks. However, as the number of memory blocks included in the first memory block 40_1 of the memory system 110 increases, a cost of the memory system 110 may increase (for example, the cost per stored bit may increase). The efficiency of the memory system 110 may be decreased because if the memory system 110 includes a large number of memory blocks used for a buffer, those blocks are not considered part of the storage capacity of the memory system 110. Therefore, the controller 130 may control the garbage collection GC of the first memory block 40_1 included in the memory system 110 in order to seamlessly uses the first memory block 40_1 as the buffer for temporarily storing the inputted data while avoiding or reducing the associated overheads.

The controller 130 in the memory system 110 may determine whether SLC buffering operation is performed for inputted data based on data input/output (I/O) speed (I/O throughput) required by the external device or the host 102 and/or a current state regarding a data input/output operation such as data transmission between the memory system 110 and the external device. Referring to FIG. 1, the controller 130 may include input/output (I/O) control circuitry 198, input/output (I/O) speed check circuitry 194 and buffering circuitry 196.

As used in the disclosure, the term 'circuitry' can refer to all of the following: (a) hardware-only circuit implementations (such as implementations in only analog and/or digital circuitry) and (b) to combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to a particular claim element, an integrated circuit for a storage device.

The input/output (I/O) control circuitry 198 may store a piece of data transferred from an external device in the memory device 150 or output a piece of data stored in the memory device 150 in response to a request of the external device. For example, to perform a read operation, the I/O control circuitry 198 may perform address translation in response to a request transmitted from the external device. The I/O control circuitry 198 may request a piece of data stored in a specific location in the memory device 150 in response to a read request transmitted from the external device, and then the memory device 150 may output the piece of data to the I/O control circuitry 198. Further, in response to a write request transmitted from the external device, the I/O control circuitry 198 may program a piece of data at a specific position in the memory device 150.

The input/output (I/O) speed check circuitry 194 may detect or recognize an amount and a clock speed of data transmitted from an external device. For example, the memory system 110 may receive a real time clock signal (RTC) transmitted from the external device. When the I/O speed check circuitry 194 uses a clock signal exchanged between the external device and the memory system 110 (such as a clock used to synchronously transmit data), it may be difficult to determine an accurate time or period for use in determining the data input/output speed. Accordingly, the I/O speed check circuitry 194 may receive a real time clock signal (RTC) (not shown in FIG. 1) indicating an actual time from the external device, and use the real time clock signal RTC to determine the data input/output speed of the memory system 110. The real time clock signal RTC may be periodically transmitted to the I/O speed check circuitry 194. By the way of example but not limitation, a period of the real time clock signal RTC may be determined based at least on a value established between the external device and the memory system 110. When the period of the real time clock signal (RTC) transmitted to the memory system 110 is established, the I/O speed check circuitry 194 may check an amount of data transferred from the external device between transitions of the real time clock signal RTC. The I/O speed check circuitry 194 may determine the data input/output speed (e.g., I/O throughput) based on the amount of data transferred between the transitions of the real time clock signal RTC or during a period of the real time clock signal RTC.

Based on the data input/output speed determined by the I/O speed check circuitry 194, the buffering circuitry 196 may determine a buffering ratio regarding inputted data (or program data) which is transferred from an external device. Here, the buffering ratio may indicate an amount of data temporarily stored in the first memory block 40_1 as a fraction of all the inputted data transferred from the external device. For example, it is assumed that there are 100 pieces of data inputted from an external device to be stored in the memory system 110. Here, the 100 pieces of data may have all the same size. Referring to data input/output speed (e.g., I/O throughput) indicating an amount of data received by the memory system 110 per a reference time/period, the memory system 110 may temporarily store all the 100 pieces of data in the first memory block 40_1 or may store all the 100 pieces of data in the second memory block 40_2 without buffering any piece of data in the first memory block 40_1. In addition, according to an embodiment of the disclosure, the memory system 110 may temporarily store 30, 50 or 70 pieces of data in the first memory block 40_1 based at least on the data input/output speed (e.g., I/O throughput), and store the remaining pieces of data in the second memory block 40_2 without buffering any of the remaining pieces of data in the first memory block 40_1.

In any given period, the greater an amount of data inputted from the external device or host 102, the faster the memory system 110 may be required to store the amount of inputted data. On the other hand, as the amount of data inputted from the external device is smaller, the memory system 110 may have a larger operational margin for programming the amount of inputted data in the memory device 150. As the memory system 110 needs to store a piece of data faster, an amount of data stored in the first memory block 40_1 may be increased.

The buffering circuitry 196 may determine the buffering ratio in response to the data input/output speed (e.g., I/O throughput) of the memory system 110. According to an embodiment, the buffering circuitry 196 may not determine which piece of data is programmed in the first memory block 40_1 or the second memory block 40_2. After the buffering circuitry 196 determines the buffering rate, the I/O control circuitry 198 may classify inputted data (that is, the data to be programmed) into plural groups according to the buffering rate. For example, the inputted data may be randomly divided or sequentially divided into two groups. Thereafter, the I/O control circuitry 198 may store the first group of inputted data in the first memory block 40_1 and the second group of inputted data in the second memory block 40_2.

According to an embodiment, the input/output (I/O) control circuitry 198 may divide the inputted data into the plural groups such that an interleaving operation occurs through a plurality of channels between the controller 130 and the memory device 150. For example, the plurality of memory dies included in the memory device 150 may be coupled with the I/O control circuitry 198 of the controller 130 through different channels or ways. Here, each die may include at least one of the first memory block 40_1 and at least one of the second memory block 40_2. Also, the time required for programming a piece of data in the first block 40_1 and the time required for programming a piece of data in the second block 40_2 can be different. Accordingly, the I/O control circuitry 198 may correlate plural pieces of inputted data and parallelly transfer correlated pieces of inputted data into plural dies including the first memory block 40_1 and/or the second memory block 40_2, based on an operation margin of each die included in the memory device 150.

Figure 2:
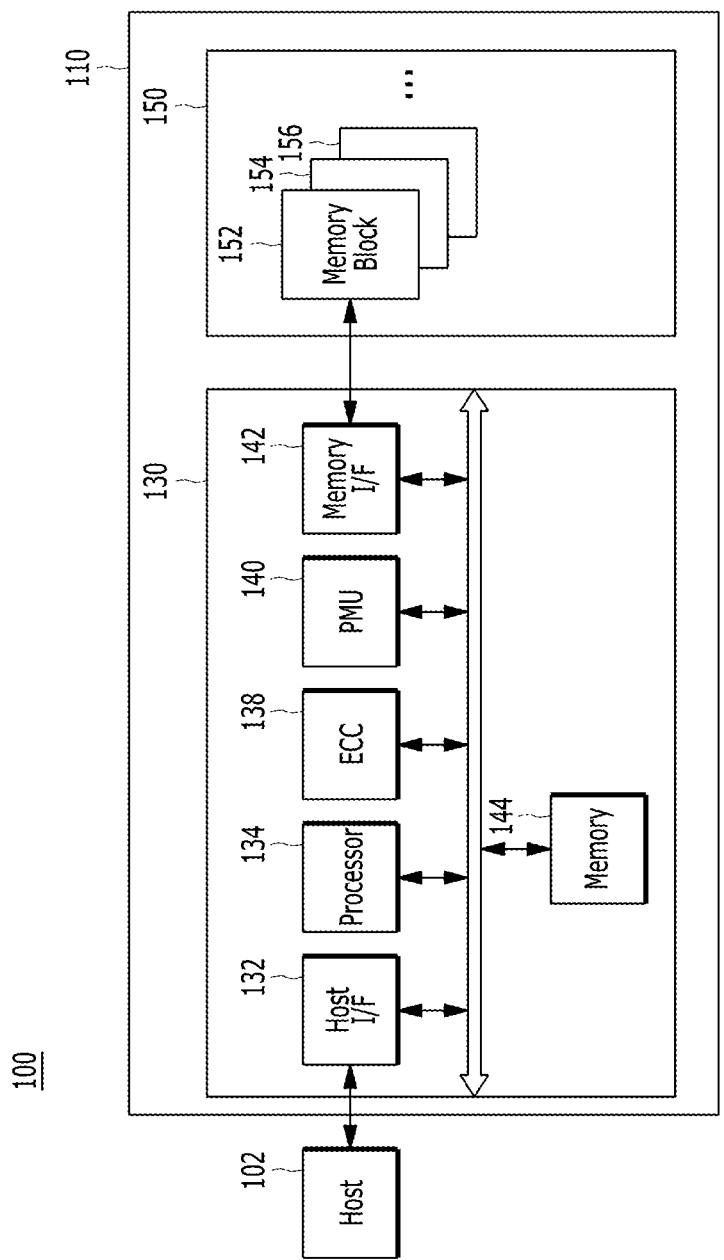
FIG. 2 illustrates a data processing system including a memory system according to an embodiment of the disclosure.

In FIG. 2, a data processing system 100 in accordance with an embodiment of the disclosure may include a host 102 engaged or operably coupled with a memory system 110.

The host 102 may include, for example, any of a variety of portable electronic devices, such as a mobile phone, an MP3 player and a laptop computer, or a non-portable electronic device such as a desktop computer, a game player, a television (TV), a projector and the like.

The host 102 also includes at least one operating system (OS), which can generally manage and control functions and operations performed in the host 102. The OS can provide interoperability between the host 102 engaged with the memory system 110 and the user of the memory system 110. The OS may support functions and operations corresponding to user's requests. By way of example but not limitation, the OS may include a general operating system or a mobile operating system according to the mobility of the host 102. The general operating system may be a personal operating system or an enterprise operating system according to system requirements or user's environment. The personal operating system, including Windows and Chrome, may support services for general purposes. Enterprise operating systems may be specialized for securing and supporting high performance, and may include Windows Server, Linux, Unix, and the like. Mobile operating system may include Android, iOS, Windows mobile, and the like. The mobile operating system may support services or functions for mobility (e.g., a power saving function). The host 102 may include a plurality of operating systems. The host 102 may execute multiple operating systems interlocked with the memory system 110, according to a user's requests. The host 102 may transmit a plurality of commands corresponding to the user's requests to the memory system 110, thereby performing operations corresponding to commands within the memory system 110. Handling the plurality of commands in the memory system 110 is described below with reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and/or a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage and retrieval of data in the memory device 150.

The controller 130 and the memory device 150 may be integrated into a single semiconductor device, which may be included in any of the various types of memory systems described above.

By way of example but not limitation, the controller 130 and the memory device 150 may be integrated into a single semiconductor device. The controller 130 and memory device 150 may be so integrated to form an SSD for improving operation speed. When the memory system 110 is used as an SSD, the operating speed of the host 102 connected to the memory system 110 can be improved, as compared to if the host 102 was connected with a hard disk. In another embodiment, the controller 130 and the memory device 150 may be integrated into one semiconductor device to form a memory card, such as a PC card (PCMCIA), a compact flash card (CF), a smart media card (SM, SMC), a memory stick, a multimedia card (MMC, RS-MMC, MMC-micro), a SD card (SD, miniSD, microSD, SDHC), or a universal flash memory.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information using a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied to it. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 may also include a plurality of memory dies, each of which includes a plurality of planes, each of which includes memory blocks, among the plurality of memory blocks 152, 154, 156. In addition, the memory device 150 may be a non-volatile memory device, for example a flash memory, wherein the flash memory may have a three-dimensional stack structure.

The controller 130 may control overall operations of the memory device 150, such as read, write, program, and erase operations. For example, the controller 130 may control the memory device 150 in response to a request from the host 102. The controller 130 may provide data read from the memory device 150 to the host 102. The controller 130 may store the data provided by the host 102 into the memory device 150.

The controller 130 may include a host interface (I/F) 132, a processor 134, an error correction code (ECC) unit 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols, such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through firmware called a host interface layer (HIL).

The ECC unit 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC unit 138 can determine whether the error correction decoding has succeeded and output an instruction signal (e.g., a correction success signal or a correction fail signal). The ECC unit 138 can use the parity bit which is generated during the ECC encoding process to correct one or more error bits of the read data. When the number of the error bits is greater than or equal to a threshold number of correctable error bits, the ECC unit 138 may not correct the error bits but instead may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all or some of circuits, modules, systems or devices for performing the error correction operation based on at least one of the above described codes.

The PMU 140 may manage an electrical power provided in the controller 130. For example, the PMU 140 may detect power-on and power-off events.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 to the host 102. The controller 130 may store data inputted from the host 102 within the memory device 150. The memory 144 may be used to store data required for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM), or both. Although FIG. 1 exemplifies the second memory 144 disposed within the controller 130, the present invention is not limited to that arrangement. That is, the memory 144 may be within or external to the controller 130. For instance, the memory 144 may be embodied by an external volatile memory having a memory interface transferring data and/or signals between the memory 144 and the controller 130.

The memory 144 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may serve as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may load, generate, update, or store map data. Therefore, the controller 130 may translate a logical address, which is entered from the host 102, into a physical address of the memory device 150 using the map data. This address translation operation may be performed in each of read or write operations in the memory system 110. Also, through the address translation operation based on the map data, when the controller 130 tries to update data stored in a particular page, the controller 130 may program the updated data on another empty page and may invalidate old data stored in the particular page (e.g., update a physical address, corresponding to a logical address regarding the updated data, in the map data from the particular page to the newly programed page) to accommodate characteristics of a flash memory device. Further, the controller 130 may store map data of the new data into the FTL.

For example, when performing an operation requested by the host 102 in the memory device 150, the controller 130 may use the processor 134 implemented as a microprocessor or central processing unit (CPU) or the like. The processor 134 engaged with the memory device 150 can generate and/or execute instructions or commands corresponding to an inputted command from the host 102. The controller 130 can perform a foreground operation as a command operation, corresponding to an command inputted from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 may include an operation of copying and storing data in a memory block, among the memory blocks 152, 154, 156 in the memory device 150, to another memory block (e.g., a garbage collection (GC) operation). The background operation may include an operation to move or swap data stored in at least one of the memory blocks 152, 154, 156 in a memory device 150, into at least another of the memory blocks 152, 154, 156 (e.g., a wear leveling (WL) operation).

During a background operation, the controller 130 may use the processor 134 to store the map data stored in the controller 130 to at least one of the memory blocks 152, 154, 156, (e.g., a map flush operation). A bad block management operation of checking for bad blocks among the plurality of memory blocks 152, 154, 156 is another example of a background operation that may be performed by the processor 134.

In the memory system 110, the controller 130 performs a plurality of command operations corresponding to a plurality of commands received from the host 102. For example, when performing a plurality of program operations corresponding to plural program commands, a plurality of read operations corresponding to plural read commands, and a plurality of erase operations corresponding to plural erase commands sequentially, randomly or alternatively, the controller 130 can determine which channel(s) or way(s) for connecting the controller 130 to which memory die(s) in the memory 150 is/are proper or appropriate for performing each operation. The controller 130 can send or transmit data or instructions via the determined channel(s) or way(s) for performing each operation. The plurality of memory dies can transmit an operation result via the same channel(s) or way(s), respectively, after each operation is complete. Then, the controller 130 may transmit a response or an acknowledge signal to the host 102. In an embodiment, the controller 130 can check a status of each channel or each way. In response to a command received from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding channels (or ways) associated with memory dies in the memory device 150. The controller 130 may determine each channel or each way as being in a busy state, a ready state, an active state, an idle state, a normal state, or an abnormal state. The controller's determination of which channel or way an instruction (and/or a data) is delivered through can be based on a physical block address that determines to which die(s) the instruction (and/or the data) is delivered. The controller 130 can refer to descriptors delivered from the memory device 150. The descriptors can include a block or page of parameters that describe informative items about the memory device 150, which parameters may have a set format or structure. For instance, the descriptors may include device descriptors, configuration descriptors, unit descriptors, and the like. The controller 130 can refer to, or use, the descriptors to determine with which channel(s) or way(s) an instruction or data is exchanged.

A management unit (not shown) may be included in the processor 134. The management unit may perform bad block management of the memory device 150. The management unit may find bad memory blocks, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
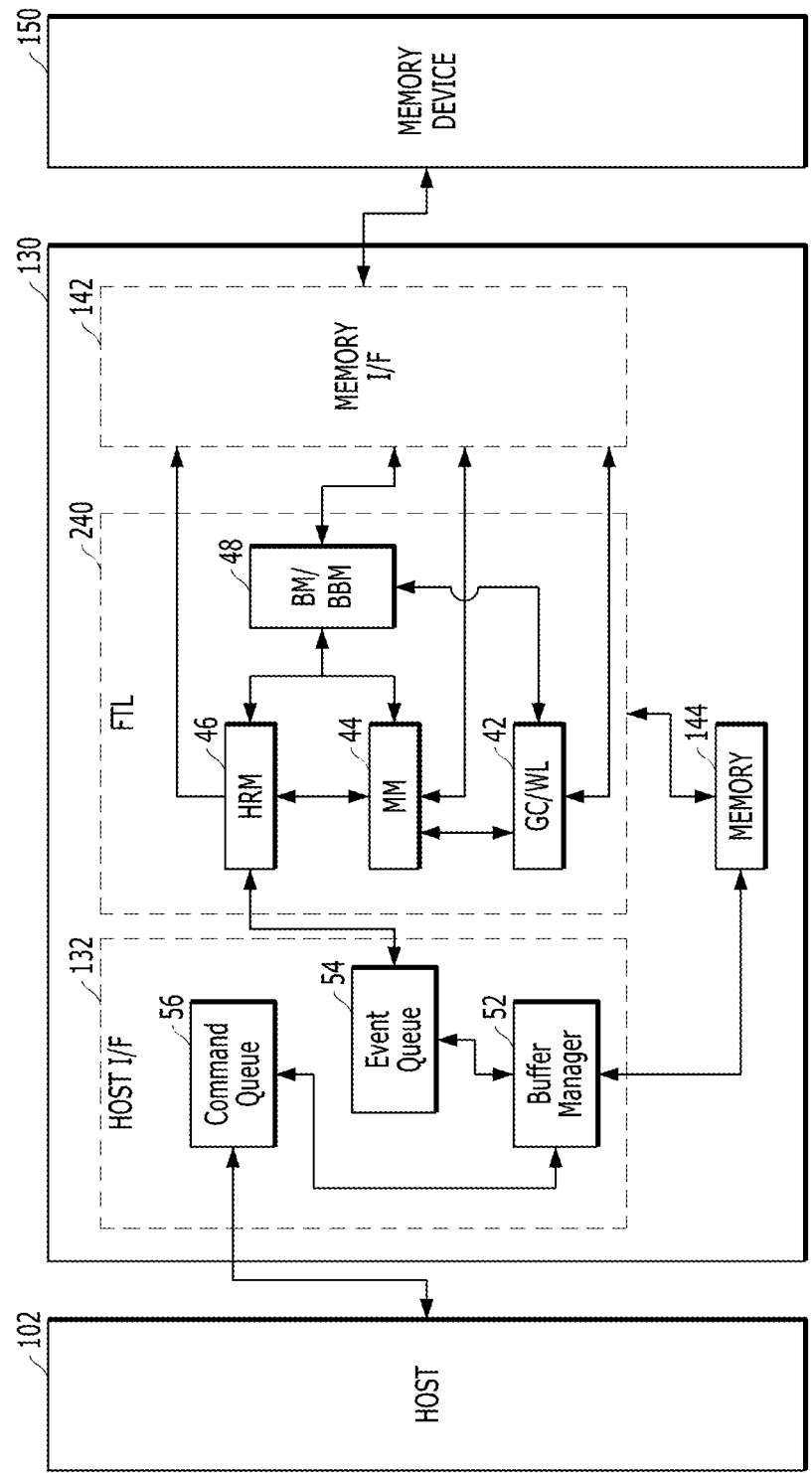
FIG. 3 illustrates a controller in a memory system according to an embodiment of the disclosure.

Referring to FIG. 3, a controller 130 in a memory system in accordance with another embodiment of the disclosure is described in detail. The controller 130 cooperates with the host 102 and the memory device 150. The controller 130 can include a host interface 132, a flash translation layer (FTL) unit 240, a memory interface 142 and a memory 144.

Although not shown in FIG. 3, in accordance with an embodiment, the ECC unit 138 described in FIG. 2 may be included in the flash translation layer (FTL) unit 240. In another embodiment, the ECC unit 138 may be implemented as a separate module, a circuit, firmware or the like, which is included in, or associated with, the controller 130.

The host interface 132 is for handling commands, data, and the like transmitted from the host 102. By way of example but not limitation, the host interface 132 can include a command queue 56, a buffer manager 52 and an event queue 54. The command queue 56 can sequentially store commands, data, and the like transmitted from the host 102 and output them to the buffer manager 52 in a stored order. The buffer manager 52 can classify, manage or adjust the commands, the data, and the like, which are delivered from the command queue 56. The event queue 54 can sequentially transmit events for processing the commands, the data, and the like transmitted from the buffer manager 52.

A plurality of commands or data of the same characteristic may be continuously transmitted from the host 102, or commands and data of different characteristics may be transmitted to the memory system 110 after being mixed or jumbled. For example, a plurality of commands for reading data (read commands) may be delivered, or commands for reading data (read commands) and programming/writing data (write commands) may be alternately transmitted to the memory system 110. The host interface 132 can store commands, data, and the like, which are transmitted from the host 102, to the command queue 56 sequentially. Thereafter, the host interface 132 can estimate or predict what kind of internal operation the controller 130 will perform according to the characteristics of the command, data, etc., which was transmitted from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) unit 240. The event queue 54 receives events, entered from the buffer manager 52, which are to be internally executed and processed by the memory system 110 or the controller 130 in response to the commands, the data, etc. transmitted from the host 102, so as to deliver the events into the flash translation layer (FTL) unit 240 in the order received.

In accordance with an embodiment, the flash translation layer (FTL) unit 240 can include a host request manager (HRM) 46, a map manager (MM) 44, a state manager 42 and a block manager 48. The host request manager (HRM) 46 can manage the events entered from the event queue 54. The map manager (MM) 44 can handle or control map data. The state manager 42 can perform garbage collection or wear leveling. The block manager 48 can execute commands or instructions related to blocks in the memory device 150.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map data manager (MM) 44, to determine a physical address corresponding to the logical address which is entered with the events. The host request manager (HRM) 46 can send a read request with the physical address to the memory interface 142, to process the read request (handle the events). On the other hand, the host request manager (HRM) 46 can send a program request (write request) to the block manager 48, to program entered data to an empty page (having no data) in the memory device 150, and then, can transmit a map update request corresponding to the program request to the map manager (MM) 44, to update an item relevant to the programmed data in information mapping logical addresses and physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. The block manager 48 may send several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase remaining data in the blocks from which the valid data was moved so that the block manager 48 may have enough free blocks (empty blocks with no data). If the block manager 48 provides information regarding a block to be erased to the state manager 42, the state manager 42 is able to check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) has not been completed, the map manager 44 may not perform the mapping table update. This is because the map request is issued with old physical information if the status manger 42 requests a map update and a valid page copy is not completed until later. The map manager 44 may perform a map update operation to ensure accuracy only if the latest map table still points to the old physical address.

In accordance with an embodiment, at least one of the state manager 42, the map manager 44 or the block manager 48 can include operation information confirmation circuitry. Further, in another embodiment, the I/O control circuitry 198 shown in FIG. 1 may include at least one of the state manager 42, the map manager 44, the block manager 48 or the memory interface 142.

The memory device 150 can include a plurality of memory blocks. The plurality of memory blocks can be different types of memory blocks, such as a single level cell (SLC) memory block or a multi-level cell (MLC) memory block, according to the number of bits that can be stored or represented in one memory cell of such block. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have a larger storage capacity for the same space compared to the SLC memory block. The MLC memory block can be highly integrated in terms of storage capacity. In an embodiment, the memory device 150 may be implemented with MLC memory blocks, such as a double level cell memory block, a triple level cell (TLC) memory block, a quadruple level cell (QLC) memory block and a combination thereof. The double level memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory, a NOR flash memory, and the like. In another embodiment, the memory device 150 may be implemented by at least one of a phase change random access memory (PCRAM), a ferroelectrics random access memory (FRAM), a spin injection magnetic memory, and a spin transfer torque magnetic random access memory (STT-MRAM), or the like.

Figure 4:
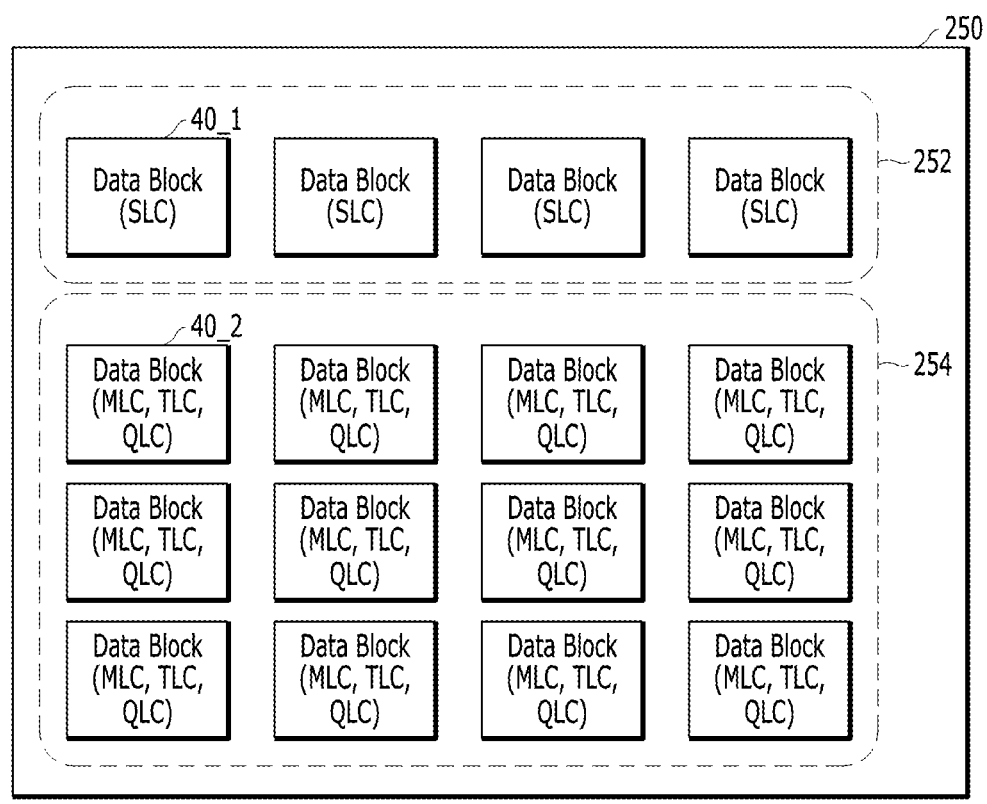
FIG. 4 shows an example of a memory device included in a memory system according to an embodiment of the disclosure.

FIG. 4 illustrates an example of a memory device according to an embodiment of the disclosure.

Referring to FIG. 4, a nonvolatile memory die 250 may include a first region 252 and a second region 254. The first region 252 includes a plurality of first memory blocks 40_1 each including one or more single-level cells (SLCs). The second region 254 may include a plurality of second memory blocks 40_2 each including one or more multi-level cells (MLCs). The nonvolatile memory die 250, including the first region 252 and the second region 254, may be included in the memory device 150 described with reference to FIGS. 1 to 3.

In an embodiment, the controller 130 (see FIGS. 1 to 3) and the memory device 150 (see FIGS. 1 to 3) may be connected through a plurality of channels. The memory device 150 may include a plurality of nonvolatile memory dies 250. Each nonvolatile memory die 250 may be coupled with the input/output (I/O) control circuitry 198 included in the controller 130 through different channels or different ways.

Memory cells included in the first memory block 40_1 and the second memory block 40_2, individually included in the first region 252 and the second region 254 of the nonvolatile memory die 250, may store a piece of data having different sizes. However, according to an embodiment, the memory cells included in the first memory block 40_1 and the second memory block 40_2 may have the same physical structure or characteristics. For example, when the first memory block 40_1 and the second memory block 40_2 included in the first region 252 and the second region 254 may have substantially the same structure, the memory cell included in the first memory block 40_1 may be capable of storing multi-bit data like the second memory block 40_2, but the controller 130 intentionally uses the first memory block 40_1 to store only 1-bit data, and not multi-bit data.

When the first memory block 40_1 and the second memory block 40_2 included in the first region 252 and the second region 254 may have the same structure according to an embodiment, the memory system 110 shown in FIGS. 1 to 3 may dynamically determine which memory block belongs to the first region 252 and which belong to the second region 254. For example, in the memory die 250, the number of memory blocks included in the first region 252 and the number of memory blocks included in the second region 254 may be changed according to an operational environment of the memory system 110. In addition, it may be determined that each memory block may be used as either the first memory block 40_1 or the second memory block 40_2, based at least on an operational state (e.g., a health state, a degree of wear-out, etc.) of the memory block included in the nonvolatile memory die 250.

Figure 5:
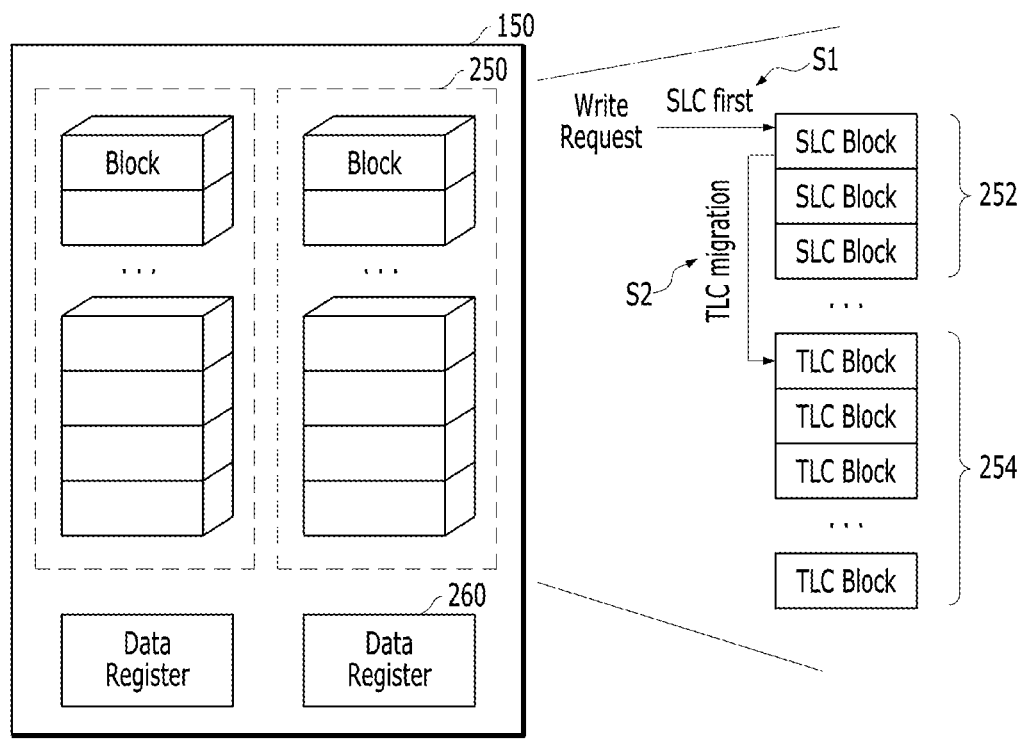
FIG. 5 illustrates a first example of SLC buffering according to an embodiment of the disclosure.

FIG. 5 illustrates a first example of SLC buffering according to an embodiment of the disclosure. Specifically, regarding a piece of data to be temporarily stored in the first memory block 40_1 including the single level cell (SLC), which is divided or classified by the input/output (I/O) control circuitry 198 included in the controller 130 show in FIG. 1, an internal procedure of the memory system 110 is described.

Referring to FIG. 5, the memory device 150 may include two nonvolatile memory dies 250 and two data registers 260. The number of nonvolatile memory dies and the number of data registers, which are included in the memory device 150, may be changed according to a purpose, a usage, a performance, a design, and the like of the memory device 150 or the memory system 110.

The data register 260 may be arranged in the memory device 150 to correspond with the nonvolatile memory die 250. According to an embodiment, the data register 260 may be disposed outside or inside the nonvolatile memory die 250.

A write request may be transferred from the input/output (I/O) control circuitry 198 in the controller 130 to the memory device 150. The I/O control circuitry 198 may divide inputted data into plural groups. One of the plural groups includes a piece of data to be temporarily stored in the first memory block 40_1. Herein, the piece of data may be temporarily stored in the first block 40_1 in the first region 252 via the data register 260 (S1). Thereafter, when the memory system 110 is in an idle state, the piece of data temporarily stored in the first memory block 40_1 may be transferred to the second memory block 40_2 included in the second region 254 (S2).

In an embodiment, plural pieces of data temporarily stored in the first memory block 40_1 may be transferred to the second memory block 40_2 when the nonvolatile memory die 250 is in an idle state. For example, when no request is received from the controller 130, no request may be delivered from the controller 130 into the nonvolatile memory die 250. The nonvolatile memory die 250 may be controlled to sequentially transfer or move the plural pieces of data stored in the first memory block 40_1 into the second memory block 40_2 and, then, inform the controller 130 of the changed physical locations regarding the plural pieces of data. Based on a notification from the nonvolatile memory die 250, the controller 130 may update map information corresponding to the plural pieces of data to complete data migration from the first memory block 40_1 to the second memory block 40_2.

In FIG. 5, regarding other pieces of data divided to be stored in the second memory block 40_2, which are distinguishable from the plural pieces of data classified to be temporarily stored in the first block 40_1, the other pieces of data can be transferred from the data register 260 to the second memory block 40_2.

According to an embodiment, the data register 260 may be divided into two parts: a first space for temporarily storing a piece of data to be stored in the first memory block 40_1, and a second space for temporarily storing another piece of data to be stored in the second memory block 40_2. A size of the piece of data stored in the first space may be different from a size of the piece of data stored in the second space, because a size of data corresponding to a page of the first memory block 40_1 is different from a size of data corresponding to a page of the second memory block 40_2. For example, a piece of data stored in the first space has a size corresponding to a page including plural memory cells each storing 1-bit data. The piece of data may be programmed on a page basis to the first memory block 40_1. Further, another piece of data stored in the second space has a size corresponding to a page including plural memory cells each storing multi-bit data. The another piece of data stored in the second space may be also programmed on a page basis to the second memory block 40_2.

Figure 6:
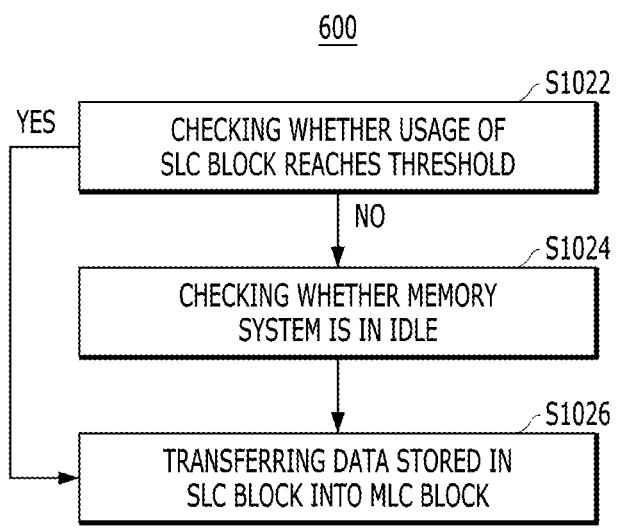
FIG. 6 illustrates a second example of SLC buffering according to an embodiment of the disclosure.

FIG. 6 illustrates a second example of a process 600 of controlling SLC buffering according to an embodiment of the disclosure. The controller 130 in the memory system 110 (see FIGS. 1 to 3) may temporarily store inputted data (i.e. data to be programmed) in the first memory block 40_1 (see FIG. 1 and FIGS. 4 to 5), based on a buffering ratio.

Referring to FIG. 6, a process 600 for operating the memory system 110 may include checking whether a usage of SLC blocks reaches a threshold (S1022), checking whether the memory system is in an idle state (S1024), and transferring data temporarily stored in the SLC blocks into another memory block including multi-level cells (S1026). Here, the SLC blocks may include a first memory block 40_1 including a single-level cell shown in FIGS. 1 and 4 to 5. The another memory block including the multi-level cells may include the second memory block 40_2 shown in FIGS. 1 and 4 to 5.

When the number of memory blocks which can store new data among the first memory blocks 40_1 included in the memory device 150 (see FIGS. 1 to 3 and 5) is sufficient, the controller 130 may not have to perform garbage collection (GC) to secure a free memory block, and therefore may not have to immediately transfer data temporarily stored in the first memory blocks 40_1 to the second memory block 40_2. However, when it is determined that the number of memory blocks which are free to be used as a buffer for temporarily storing new data among the first memory blocks 40_1 is not sufficient, the controller 130 may transfer the data temporarily stored in the first memory block 40_1 into the second memory block 40_2 and erase the data stored in the first memory block 40_1 to secure a free memory block.

For example, assume that 20 memory blocks included in the memory device 150 are allocated as the first memory blocks 40_1. If a threshold is 15, at least five free memory blocks may be available in the first memory blocks 40_1 for temporarily storing inputted data within the memory device 150. When inputted data is temporarily stored in a 16$^{th}$ memory blocks allocated as the first memory blocks 40_1 (YES in step S1022), it is recognized that the first memory blocks 40_1 includes less than five free memory blocks. At this time, the controller 130 or the memory device 150 may try to transfer at least some data stored in the first memory blocks 40_1 into the second memory blocks 40_2 (S1026) in order to secure at least five free memory blocks. Different embodiments may determine which data is transferred into the second memory blocks 40_2 differently. For example, data temporarily stored in the oldest closed state memory block among the first memory block 40_1 may be first transferred into the second memory block 40_2, wherein a closed state memory block is a memory block in which all of the pages have been programmed so that a piece of data may not be newly programmed without an erase operation since the last erasure of the memory block. In another example, data temporarily stored in a memory block having the lowest valid page count (VPC) among the first memory blocks 40_1 may be the first transferred into the second memory block after respective valid page counts (VPCs) of each memory block among the first memory blocks 40_1 are compared with each other. On the other hand, in a case when there are 10 free memory blocks which are remained for temporarily storing the inputted data among the first memory blocks 40_1, the controller 130 does not have to immediately attempt to transfer any of the data which is temporarily stored in the first memory blocks 40_1 into the second memory block 40_2.

A criterion regarding whether enough free memory blocks among the first memory blocks 40_1 are available may vary according to the threshold. According to an embodiment, the threshold may be fixed or dynamically established based on an operation environment of the memory system 110. For example, the memory system 110 or the controller 130 may determine the threshold based on data input/output speed (e.g., I/O throughput) or data input/output performance (e.g., bandwidth), which is required by an external device. When an amount of data inputted to the memory system 110 is larger, more free memory blocks in the first memory blocks 40_1 may be secured for storing data temporarily because SLC buffering using the first memory blocks 40_1 can improve the data input/output speed (e.g., I/O throughput) or the data input/output performance (e.g., bandwidth). When the controller 130 may adjust the threshold, a timing for performing the garbage collection to the first memory blocks 40_1 may be determined based on the operation environment of the memory system 110.

Meanwhile, even when the number of free memory blocks among the first memory blocks 40_1 is enough (No in step S1022), it may be determined whether the memory system 110 is in the idle state (S1024). When the memory system 110 is in an idle state, data temporarily stored in the first memory blocks 40_1 may be transferred into the second memory block 40_2. In the idle state, even if the usage of the first memory blocks 40_1 does not reach the threshold, at least some data stored in the first memory blocks 40_1 may be transferred into the second memory block 40_2 in advance. When data migration and/or garbage collection may be performed in advance, the likelihood of incurring overhead when a large amount of data is stored or when high data input/output speed is required may be reduced.

Figure 7:
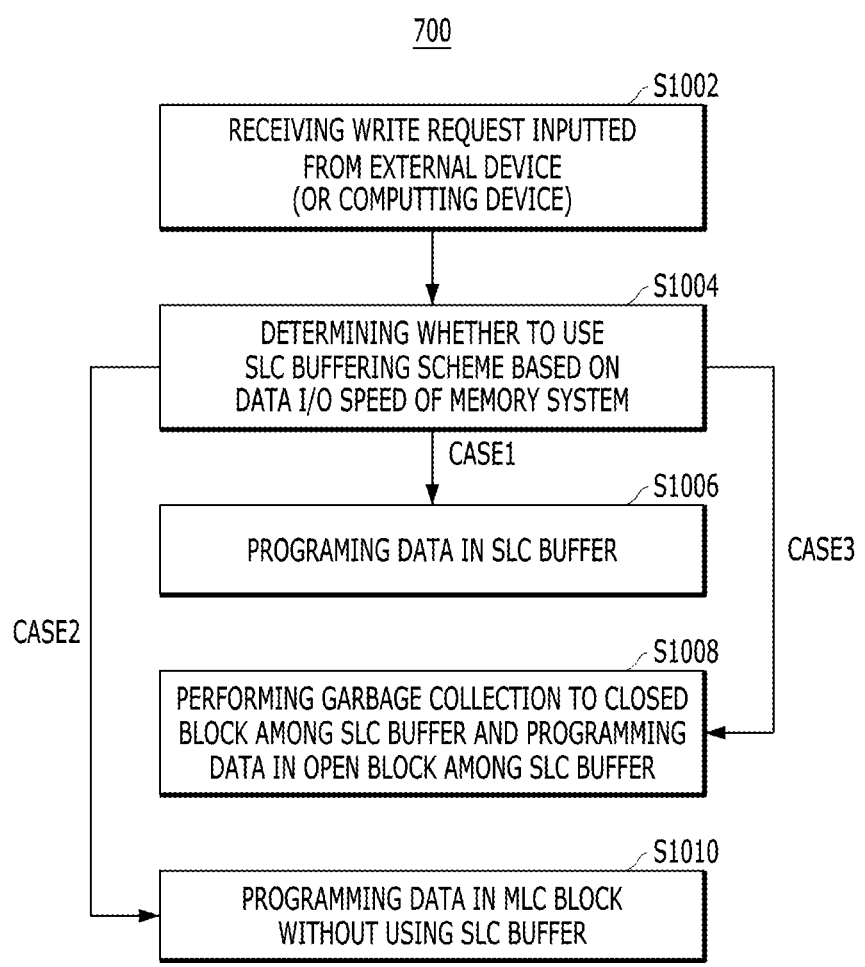
FIG. 7 illustrates a first process for operating a memory system according to an embodiment of the disclosure.

FIG. 7 illustrates a first example of a process 700 for operating a memory system according to an embodiment of the disclosure.

The process 700 for operating the memory system 110 (see FIGS. 1 to 3) may include receiving a write request inputted from an external device or a computing device (S1002). The external device or the computing device may include the host 102 shown in FIGS. 2 to 3.

A write request, which is received from the external device or the computing device, may include a piece of data and a logical address corresponding to the piece of data. The logical address may include a value determined according to an address scheme used by the external device or the computing device to indicate the piece of data. Further, the memory system 110 may use another address scheme which can be distinguishable and different from the address scheme used by the external device or the computing device. A value according to the address scheme used by the memory system may be referred to as a physical address. The controller 130 in the memory system 110 (see FIGS. 1 to 3) can associate a logical address with a physical address, thereby performing an address translation from a logical address to a physical address or vice versa.

According to an embodiment, the method for operating the memory system 110 may include determining whether to use an SLC buffering scheme based at least on data input/output speed (e.g., I/O throughput) of the memory system 110 (S1004). The controller 130 in the memory system 110 may recognize an amount of data transferred with one or more write requests from the external device in a preset reference time period (for example, a period of a real time clock), and the controller 130 may thereby determine a data input/output speed (e.g., I/O throughput) required by the external device.

By the way of example but not limitation, the controller 130 may program a piece of input data in a SLC buffer (S1006) when the data input/output speed (e.g., I/O throughput) is more than a first reference value (CASE1). The controller 130 may temporarily store all inputted data (that is, data to be programmed) in the SLC buffer. In this case, the consumption of the SLC buffer (usage of the SLC buffer) may increase rapidly. As not shown, the controller 130 may determine a buffering ratio based on the data input/output speed (e.g., I/O throughput). The controller 130 may temporarily store at least some of the inputted data in the SLC buffer (e.g., the first memory block 40_1 shown in FIG. 1 and FIGS. 4 to 5) according to the buffering ratio. The remaining inputted data may be stored in an MLC block (e.g., the second memory block 40_2 show in FIG. 1 and FIGS. 4 to 5) without first being buffered in the SLC buffer.

When the data input/output speed (e.g., I/O throughput) of the memory system 110 is less than a second reference value (CASE2), the controller 130 may not use an SLC buffer to buffer the inputted data, but may store the inputted data in the MLC block (e.g., the second memory block 40_2) (S1010). Herein, the second reference value may be smaller than the first reference value. For example, when an amount of inputted data during the period of the real time clock is not large, the memory system 110 may have a sufficient margin to store the inputted data in the memory block including the multi-level cell within the memory device 150 (see FIGS. 1 to 3), wherein "sufficient margin" means the sufficient ability to complete the necessary operations in the time allowed. In this case, using the SLC buffer for temporarily storing the inputted data to reduce a time spent on a program operation would reduce operation efficiency of the memory system 110, because the inputted data temporarily stored in the SLC buffer would have to be transferred later into another memory block including a multi-level cell (MLC). Thus, if the data input/output speed (e.g., I/O throughput) required for the memory system 110 is less than the second reference value (CASE2), the controller 130 may program the inputted data in a MLC memory block without temporarily storing the inputted data in the SLC buffer, so that subsequent data migration from the SLC buffer to the MLC memory block can be avoided.

When the data input/output speed (e.g., I/O throughput) of the memory system 110 is less than the first reference value and more than the second reference value (CASE3), the controller 130 may perform garbage collection on a closed memory block in the SLC buffer and program at least some of the inputted data into an open memory block in the SLC buffer (S1008). Herein, an open memory block is a memory block including at least one blank page, which is used for programming a piece of data. For example, when the data input/output speed (e.g., I/O throughput) of the memory system 110 is more than the second reference value, an operation margin for programming a piece of data in the MLC buffer may be not sufficient, and therefore the piece of data is temporarily stored in the SLC buffer. On the other hand, an operation margin for programming the piece of data in the SLC buffer may be enough so that garbage collection to the SLC buffer may be performed. If the garbage collection is performed to the SLC buffer when the data input/output speed (e.g., I/O throughput) of the memory system 110 is more than the first reference value, a free memory block in the SLC buffer may be secured for a subsequent program operation. As the number of free memory blocks is increased, it is likely that overhead might be reduced for subsequent operations.

Figure 8:
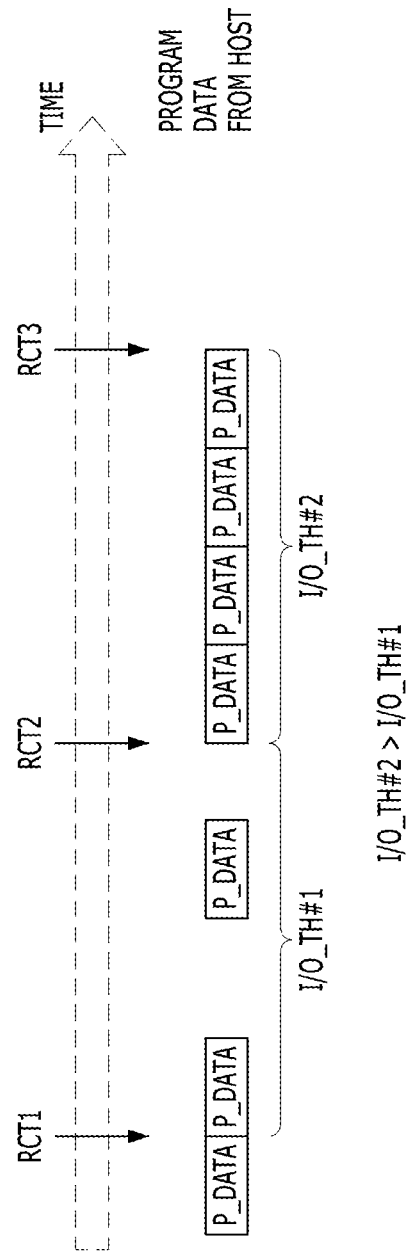
FIG. 8 illustrates a process for estimating data input/output (I/O) speed according to an embodiment of the disclosure.

FIG. 8 illustrates a method for estimating data input/output speed according to an embodiment of the disclosure.

Referring to FIG. 8, the memory system 110 (see FIGS. 1 through 3) may periodically recognize first, second, and third transitions of real time clock RTC1, RTC2, RTC3 inputted from the host 102 (see FIGS. 2 through 3), wherein the arrows in FIG. 8 indicate the beginning and the end of each cycle or period. Also, the memory system 110 may receive data to be programmed P_DATA inputted from the host 102.

The memory system may recognize an amount of data to be programmed inputted from the host during a first period of the real time clock (e.g., between the first transition of real time clock RTC1 and the second transition of real time clock RTC2). For example, two pieces of program data P_DATA (that is, data that is to be programmed into the memory system) are transferred from the host to the memory system between the first transition of real time clock RTC1 and the second transition of real time clock RTC2. Four pieces of program data P_DATA are transferred from the host to the memory system between the second transition of real time clock RTC2 and the third transition of real time clock RTC3. When it is assumed that a size of each piece of program data is the same, an amount of program data transferred between the second transition of real time clock RTC2 and the third transition of real time clock RTC3 is twice the amount of program data transferred between the first transition of real time clock RTC1 and the second transition of real time clock RTC2.

Because the transitions of real time clock RTC1, RTC2, RTC3 may be recognized by the memory system at the same frequency (that is, the period between each transition of real time clock and the subsequent transition of real time clock is the same), a second data input/output speed I/O_TH #2 required for the memory system between the second transition of real time clock RTC2 and the third transition of real time clock RTC3 is greater than a first data input/output speed I/O_TH #1 required for the memory system between the first transition of real time clock RTC1 and the second transition of real time clock RTC2. Because the second data input/output speed I/O_TH #2 is greater than the first data input/output speed I/O_TH #1, the controller 130 may recognize that the data input/output performance (e.g., I/O throughput) of the memory system 110 required by the host 102 is increasing over time. As a result, the controller 130 (see FIGS. 1 to 3) in the memory system 110 may increase the buffering ratio. The controller 130 can increase an amount of the program data P_DATA inputted from the host 102 and temporarily stored in the first memory block 40_1 (refer to FIG. 1 or FIGS. 4 to 5) including a single-level cell (SLC), so that the memory system may be able to satisfy the data input/output speed required by the host.

Although not shown, the data input/output speed of the memory system 110, which is required by the host 102, may also decrease over time. When the data input/output speed required by the host 102 becomes lower, the memory system 110 may respond by decreasing the buffering ratio.

Meanwhile, depending on an internal configuration or a method for operating the memory system 110, a time required for performing a read operation, a program operation, an erase operation or a garbage collection (GC) operation may be different. Accordingly, the controller 130 in the memory system 110 may have different operation margins for a read operation, a program operation, an erase operation or a garbage collection (GC) operation. The controller 130 in the memory system 110 may determine whether to use a buffer, as well as set a buffering ratio dynamically, based at least on the data input/output speed required by the host 102.

FIG. 9 illustrates a first example of a process for determining whether to use an SLC buffering scheme according to an embodiment of the disclosure. Specifically, regarding the internal operation of the memory system 110 (see FIGS. 1 to 3), a first time (SLC PROGRAM TIME) required to store (e.g., program) a piece of data in the first memory block (e.g., 40_1 shown in FIG. 1 or FIGS. 4 to 5) including a single level cell (SLC) may be shorter than a second time (SLC GC TIME) required to perform garbage collection to the first memory block. The second time (SLC GC TIME) may be shorter than a third time (TLC PROGRAM TIME)

required to store a piece of data in the second memory block (e.g., 40_2 shown in FIG. 1 or FIGS. 4 to 5) including a triple-level cell (TLC).

Referring to FIG. 9, the controller 130 (see FIGS. 1 to 3) may determine which operation or process is performed based on a range that the data input/output speed (e.g., I/O THROUGHPUT) which is required by the host 102 (see FIGS. 2 to 3) or an external device is in. Regarding an operation for programming inputted data, an operation or a process may be performed differently in the memory system 110. In the example, a first threshold TH #1 is greater than a second threshold TH #2. According to an embodiment, the controller 130 may determine whether to perform SLC buffering, SLC buffering with garbage collection, or MLC programming without SLC buffering (i.e., SLC buffering disabled), according to ranges determined by the first and second thresholds TH #1 and TH #2. For example, when the data input/output speed (e.g., I/O THROUGHPUT) required by the host 102 or the external device is greater than the first threshold value TH #1 ("TH #1>" in FIG. 9), the controller 130 is configured to temporarily store inputted data in the first memory block 40_1 including a single level cell (SLC), so that a time spent on programming the inputted data can be reduced. On the other hand, when the data input/output speed (e.g., I/O THROUGHPUT) required by the host 102 or the external device is smaller than the second threshold TH #2 ("<TH #2" in FIG. 9), the controller 130 does not have to use the first memory block 40_1 including a single level cell (SLC), but instead may store the inputted data in the second memory block 40_2 including a multi-level cell (MLC), e.g., a triple-level cell (TLC), without temporarily storing the inputted data in the first memory block 40_1. When the data input/output speed (e.g., I/O THROUGHPUT) required by the host 102 or the external device falls within a range between the first threshold value TH #1 and the second threshold value TH #2 ("TH #1~TH #2" in FIG. 9), the controller 130 may perform garbage collection (GC) on the first memory block 40_1 including the single level cell SLC, as well as temporarily storing the inputted data in the first memory block 40_1.

FIG. 10 illustrates a second example of a process for determining whether to use the SLC buffering scheme, based on an operational condition, according to an embodiment of the disclosure. Specifically, regarding the internal operation of the memory system 110 (see FIGS. 1 to 3), a first time (SLC PROGRAM TIME) required to store a piece of data in the first memory block (e.g., 40_1 shown in FIG. 1 or FIGS. 4 to 5) including a single level cell (SLC) may be shorter than a third time (TLC PROGRAM TIME) required to store a piece of data in the second memory block (e.g., 40_2 shown in FIG. 1 or FIGS. 4 to 5) including a triple-level cell (TLC). The third time (TLC PROGRAM TIME) may be shorter than a second time (SLC GC TIME) required to perform garbage collection of the first memory block.

Referring to FIG. 10, the controller 130 (see FIGS. 1 to 3) may determine which operation or process is performed, based on a range of the data input/output speed (e.g., I/O THROUGHPUT) which is required by the host 102 (see FIGS. 2 to 3) or an external device. Regarding an operation for programming inputted data, an operation or a process may be performed differently in the memory system 110. In the example, a first threshold TH #1 is greater than a second threshold TH #2. According to an embodiment, the controller 130 may determine whether to perform SLC buffering, MLC programming without SLC buffering (i.e., SLC buffering disabled), or SLC buffering with garbage collection, according to ranges determined by the first and second thresholds TH #1 and TH #2. For example, when the data input/output speed (e.g., I/O THROUGHPUT) required by the host 102 or the external device is greater than the first threshold value TH #1 ("TH #1>" in FIG. 10), the controller 130 is configured to temporarily store inputted data in the first memory block 40_1 including a single level cell (SLC), so that a time spent on programming the inputted data can be reduced. On the other hand, when the data input/output speed (e.g., I/O THROUGHPUT) required by the host 102 or the external device is smaller than the second threshold TH #2 ("<TH #2" in FIG. 10), the controller 130 may perform garbage collection (GC) to the first memory block 40_1 including the single level cell SLC, as well as temporarily storing the inputted data in the first memory block 40_1. When the data input/output speed (e.g., I/O THROUGHPUT) required by the host 102 or the external device falls within a range between the first threshold value TH #1 and the second threshold value TH #2 ("TH #1~TH #2" in FIG. 10), the controller 130 may store the inputted data in the second memory block 40_2 including a multi-level cell (MLC), e.g., a triple-level cell (TLC), without temporarily storing the inputted data in the first memory block 40_1.

Referring to FIGS. 9 and 10, operational characteristics of the memory system 110, such as times spent on or required for different internal operations may be different based on the internal configuration and the method for operating the memory system 110. According to an embodiment of the disclosure, the method for handling inputted data (i.e., how to program the inputted data in the nonvolatile memory device 150) may be changed according to the operational characteristics of the memory system 110 and the data input/output speed (e.g., I/O THROUGHPUT) required by the host 102 or the external device.

Figure 11:
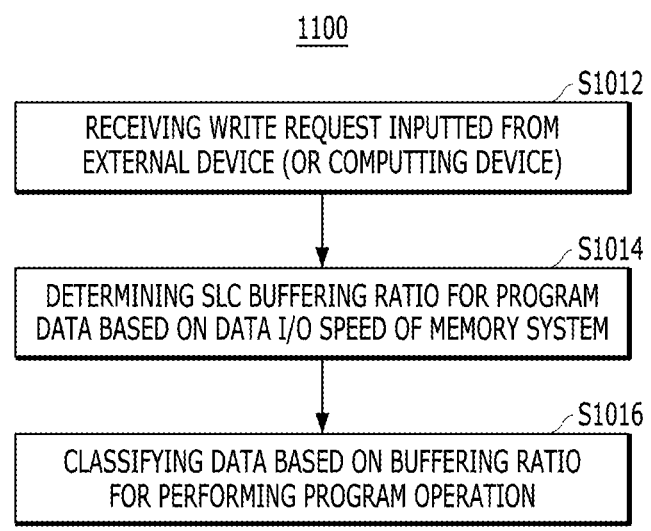
FIG. 11 illustrates a second process for operating a memory system according to an embodiment of the disclosure.

FIG. 11 illustrates a second example of a process 1100 for operating a memory system according to an embodiment of the disclosure.

The process 1100 for operating a memory system can include receiving a write request from an external device or a computing device (S1012), determining an SLC buffering ratio regarding inputted data to be programmed based on data input/output speed of the memory system (S1014), and classifying the inputted data based on the SLC buffering ratio for performing a program operation (S1016). Here, the external device or the computing device may include the host 102 shown in FIGS. 2 to 3. The SLC buffering ratio may indicate how many pieces of data inputted along with a write request are temporarily stored in a SLC buffer. For example, the SLC buffering ratio can indicate a ratio of data temporarily stored in the first memory block 40_1 including a single level cell (SLC) among all the inputted data to be programmed that is received by the memory system 110 (see FIGS. 1 to 3).

The memory system 110 may determine the SLC buffering ratio regarding the inputted data based on a determination of the data input/output speed (e.g., I/O THROUGHPUT) required by the host 102 or the external device. The data input/output speed (e.g., I/O THROUGHPUT) required by the host 102 or the external device may be different or changed depending on a usage, a performance, an internal design or an operational condition of the memory system 110. The memory system 110 may periodically check or determine the data input/output speed. Based on the data input/output speed, the memory system 110 may determine whether to perform SLC buffering regarding the inputted data, may adjust an amount of inputted data to be temporarily stored in the SLC buffer and an amount of inputted data to be stored in the MLC block without SLC buffering, or both. Accordingly, the memory system 110 may reduce the usage of the SLC buffer (or avoid rapidly increasing the usage of the SLC buffer). In addition, a frequency or the number of garbage collection operations performed on the SLC buffer may be reduced. As a result, overhead that may occur during a program operation may be reduced.

According to an embodiment of the disclosure, a memory system, a data processing system, a method of operating the same, and a method for controlling an operation performed within the memory system or the data processing system may adaptively use a nonvolatile memory device including single level cells (SLCs) when a piece of data is programmed in the memory system so that data input/output (I/O) speed may be improved or enhanced.

In addition, an embodiment of the disclosure can adjust a timing of garbage collection of a nonvolatile memory block utilized as a buffer for temporarily storing a piece of data in a memory system to reduce overhead that may occur in a program operation, so that data input/output (I/O) performance of the memory system may be improved.

While the present invention has been illustrated and described with respect to the specific embodiments, it will be apparent to those skilled in the art in light of the present disclosure that various changes and modifications may be made without departing from the spirit and scope of the invention as defined in the following claims.

What is claimed is:

1. A memory system, comprising:
a memory device including one or more first memory blocks, each including a memory cell storing a 1-bit data, and one or more second memory blocks, each including a memory cell storing a multi-bit data; and
a controller configured to estimate a data input/output speed of an operation requested by an external device and to determine a buffering ratio of pieces of buffered data among pieces of inputted data based on the estimated data input/output speed, the buffered data temporarily stored in at least one first memory block, in order to program the pieces of inputted data in at least one second memory block according to a request of the external device,
wherein the controller is configured to:
use the one or more first memory blocks as a buffer for temporarily storing the pieces of buffered data when the data input/output speed is faster than a first threshold;
program the pieces of inputted data to the one or more second memory blocks without temporarily storing the pieces of inputted data in the one or more first memory blocks when the data input/output speed is slower than a second threshold; and
perform garbage collection on at least one of the first memory blocks and use another of the first memory blocks as the buffer when the data input/output speed is slower than or equal to the first threshold and faster than or equal to the second threshold.

2. The memory system according to claim 1, wherein the controller is configured to:
divide the pieces of inputted data into two groups based on the buffering ratio;
perform a first program operation of a piece of data in a first of the two groups to the one or more first memory blocks; and
perform a second program operation of another piece of data in a second of the two groups to the one or more second memory blocks.

3. The memory system according to claim 1, wherein the first threshold is larger than the second threshold.

4. The memory system according to claim 1, wherein the garbage collection is performed on a closed memory block among the first memory blocks, and an open memory block among the first memory blocks is utilized as the buffer.

5. The memory system according to claim 1, wherein the controller is configured to:
receive a real time clock (RTC) inputted from the external device; and
determine the data input/output speed based on an amount of data inputted or outputted between two times established based on the real time clock.

6. The memory system according to claim 1, wherein the controller is configured to: check whether a usage of the first memory blocks is equal to or greater than a third threshold; and copy the pieces of buffered data temporarily stored in the one or more first memory blocks into the one or more second memory blocks in response to the usage of the first memory blocks being equal to or greater than the third threshold.

7. The memory system according to claim 1, wherein the controller is configured to copy the pieces of buffered data temporarily stored in the one or more first memory blocks into the one or more second memory blocks when the memory device is in an idle state.

8. The memory system according to claim 1, wherein the one or more second memory blocks include at least one double-level cell, at least one triple-level cell, or at least one quad-level cell.

9. The memory system according to claim 1, wherein memory cells of the one or more first memory blocks have the same structure as memory cells of the one or more second memory blocks, and the controller is configured to store respective 1-bit data in the memory cells of the one or more first memory blocks and respective multi-bit data in the memory cells of the one or more second memory blocks.

10. A method for operating a memory system comprising a memory device including one or more first memory blocks each including a memory cell storing a 1-bit data and one or more second memory blocks each including a memory cell storing a multi-bit data, the method comprising;
receiving pieces of inputted data transmitted from an external device;
estimating a data input/output speed of an operation requested by the external device;
determining, based on the estimated data input/output speed, a buffering ratio of pieces of buffered data among pieces of inputted data, the buffered data temporarily stored in the one or more first memory blocks;
determining, based on the buffering ratio, whether to program the pieces of inputted data either into the one or more first memory blocks or into the one or more second memory block;
using the one or more first memory blocks as a buffer for temporarily storing the pieces of buffered data when the data input/output speed is faster than a first threshold;
programming the pieces of inputted data to the one or more second memory blocks without temporarily storing the pieces of inputted data in the one or more first memory blocks when the data input/output speed is slower than a second threshold; and
performing garbage collection on at least one of the one or more first memory blocks and using another of the first memory blocks as the buffer when the data input/output speed is slower than or equal to the first threshold and faster than or equal to the second threshold.

11. The method according to claim 10, further comprising:
dividing the pieces of inputted data into two groups based on the buffering ratio.

12. The method according to claim 10, wherein the garbage collection is performed on a closed memory block among the first memory blocks, and an open memory block among the first memory blocks is utilized as the buffer.

13. The method according to claim 10, wherein estimating the data input/output speed includes:
receiving a real time clock (RTC) inputted from the external device; and
determining the data input/output speed based on an amount of data inputted or outputted between two times established based on the real time clock.

14. The method according to claim 10, further comprising: checking whether a usage of the first memory blocks is equal to or greater than a third threshold; and copying the pieces of buffered data temporarily stored in at least one of the one or more first memory blocks into the one or more second memory blocks in response to the usage of the first memory blocks being equal to or greater than the third threshold.

15. The method according to claim 10, further comprising:
copying the pieces of buffered data temporarily stored in the one or more first memory blocks into the one or more second memory blocks when the memory device is in an idle state.

16. The method according to claim 10, wherein memory cells of the one or more first memory blocks and memory cells of the one or more second memory blocks have the same structure.

* * * * *